United States Patent
Kuchi et al.

(10) Patent No.: US 8,873,364 B2
(45) Date of Patent: Oct. 28, 2014

(54) ORDERED REDUCED SET SUCCESSIVE DETECTOR FOR LOW COMPLEXITY, QUASI-ML MIMO DETECTION

(71) Applicants: Kiran Kumar Kuchi, Hyderabad (IN); Bhaskar Ramamurthi, Chennai (IN); Karthik Kuntikana Shrikrishna, Chennai (IN)

(72) Inventors: Kiran Kumar Kuchi, Hyderabad (IN); Bhaskar Ramamurthi, Chennai (IN); Karthik Kuntikana Shrikrishna, Chennai (IN)

(73) Assignees: Centre of Excellence in Wireless Technology, Chennai (IN); IIT-Hyderabad, Yeddumailaram (IN); IIT-Madras, Chennai (IN)

( * ) Notice: Subject to any disclaimer, the term of this patent is extended or adjusted under 35 U.S.C. 154(b) by 100 days.

(21) Appl. No.: 13/745,018

(22) Filed: Jan. 18, 2013

(65) Prior Publication Data
US 2013/0188470 A1 Jul. 25, 2013

(30) Foreign Application Priority Data
Jan. 19, 2012 (IN) .............................. 227/CHE/2012

(51) Int. Cl.
H04J 11/00 (2006.01)
H04L 1/06 (2006.01)
H04B 7/04 (2006.01)

(52) U.S. Cl.
CPC ............ *H04B 7/0413* (2013.01); *H04L 1/0656* (2013.01); *H04L 1/0631* (2013.01)
USPC .......................................... 370/203; 370/334

(58) Field of Classification Search
USPC .................................................. 370/203, 334
See application file for complete search history.

(56) References Cited

U.S. PATENT DOCUMENTS

2006/0093057 A1* 5/2006 Zhang et al. .................. 375/267

* cited by examiner

*Primary Examiner* — Sai-Ming Chan
(74) *Attorney, Agent, or Firm* — Rahman LLC

(57) ABSTRACT

An Ordered Reduced Set Successive Detector (RSSD) for the V-BLAST spatial multiplexing scheme that uses a general two-dimensional non-uniform set partitioning for different symbols. The detector provides improved diversity and SNR gains at reduced complexity compared to a uniform set partitioning based detector. The detector can be used to reduce the complexity, with a small tradeoff in performance. Further, it is possible to obtain a quasi-ML performance using the disclosed detector at a reduced, yet fixed, complexity.

8 Claims, 6 Drawing Sheets

FIG. 6

| ORSSD configuration | Modulation | BM computations |
|---|---|---|
| {16, 16, 1, 1, 1, 1, 1, 1} | 16-QAM | 1808 |
| {16, 8, 1, 1, 1, 1, 1, 1} | 16-QAM | 912 |
| {16, 4, 1, 1, 1, 1, 1, 1} | 16-QAM | 464 |
| {16, 1, 1, 1, 1, 1, 1, 1} | 16-QAM | 128 |
| {64, 64, 1, 1, 1, 1, 1, 1} | 64-QAM | 28736 |
| {64, 32, 1, 1, 1, 1, 1, 1} | 64-QAM | 14400 |
| {64, 16, 1, 1, 1, 1, 1, 1} | 64-QAM | 7232 |
| {64, 1, 1, 1, 1, 1, 1, 1} | 64-QAM | 512 |

ORDERED REDUCED SET SUCCESSIVE DETECTOR FOR LOW COMPLEXITY, QUASI-ML MIMO DETECTION

CROSS REFERENCE TO RELATED APPLICATION

This patent application claims priority from Indian provisional patent application number 227/CHE/2012, filed on Jan. 19, 2012, the contents of which in its entirety are herein incorporated by reference.

TECHNICAL FIELD

The embodiments herein relate to MIMO communication systems and, more particularly, to detection systems in MIMO communication systems.

BACKGROUND

Spatial multiplexing is a transmission technique used in Multiple Input Multiple Output (MIMO)-based communication systems, where separately encoded signals (consider each signal sent from a constellation having $M=2^q$ symbol points) are transmitted over n transmit antennas. At the receiver side, multiple receive antennas m are used to receive the transmitted signal.

Current uniform set-partitioning based detectors in receivers used in communication systems have poor diversity and low Signal-to-Noise Ratio (SNR) gains at high complexity. At a receiver in a communication system, although optimum performance can be obtained using Maximum Likelihood Detector (MLD) providing a diversity gain m for each detected data stream, its major drawback is a high computational effort of $O(M^n)=O(2^{qn})$ which grows exponentially with q and n. Hence a reduction in complexity is desired in practice.

For MIMO Spatial Multiplexing (SM) systems, Sphere Decoder (SD) provides MLD performance at low complexity. However, the major disadvantage of SD and its variants is their variable complexity depending on instantaneous SNR, leading to hardware implementation difficulties.

Further, a near-optimal, fixed-complexity detector called the V-BLAST coset detector (V-BLAST-CD) was shown to provide a near-ML performance at low-to-intermediate SNR values with two streams, with performance deterioration with an increase in SNR or the number of streams. Although a modification of V-BLAST-CD improved its performance, it involved the use of adaptive M-algorithm and variable set-partitions, thereby rendering it a variable-complexity receiver.

A "Fixed-complexity Sphere Decoder" (FSD) has been suggested to simultaneously tackle the problem of achieving near-ML performance in MIMO detection, while overcoming the variable complexity and sequential tree-search problems associated with the SD. The FSD involves two operations that are performed repeatedly such as channel reordering pre-processing operation followed by successive detection operation. A survivor vector is selected in the end to get the solution. The pre-processing technique greatly improves the performance of the FSD, while allowing for a reduction in complexity during successive detection operation. It was proved that FSD achieves the same diversity as MLD while yielding a quasi-ML performance at a very low and fixed complexity. One disadvantage that has been identified with the FSD is that its complexity increases for MIMO configurations larger than 4×4. One solution to minimize this increase in complexity is to discard some of the survivor paths during the later stages of successive detection. However, such a solution requires sorting across paths to choose the survivors.

BRIEF DESCRIPTION OF THE FIGURES

The embodiments herein will be better understood from the following detailed description with reference to the drawings, in which:

FIG. 6 shows a table that illustrates the complexity of ORSSD schemes for 8×8 MIMO SM system

DETAILED DESCRIPTION OF EMBODIMENTS

Figure 1:
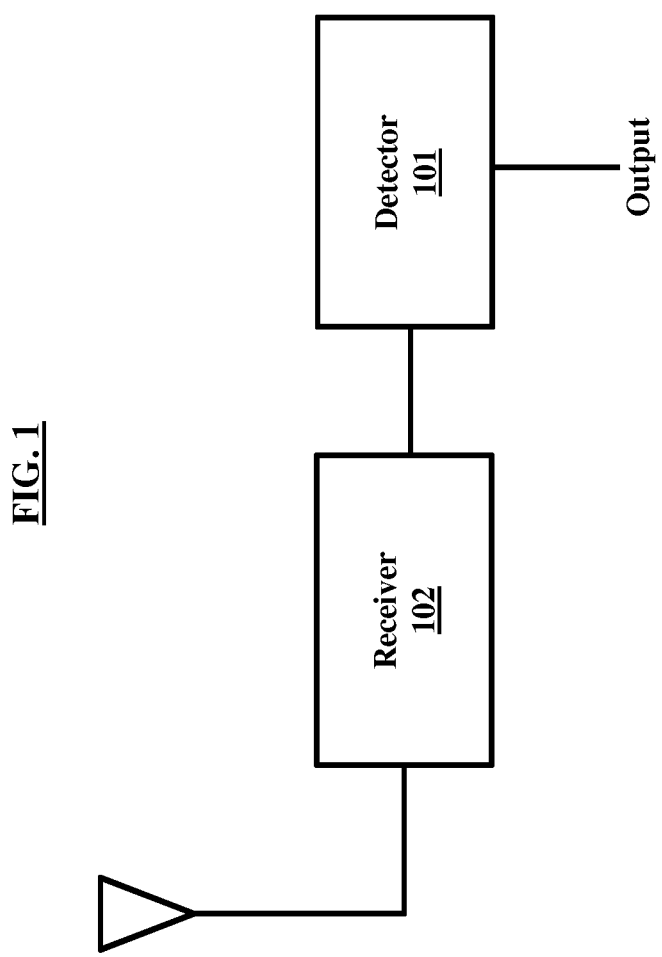
FIG. 1 depicts a receiver system in a communication network, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an ordered reduced set successive detector for low complexity, quasi-ML MIMO detection in communication systems. The embodiments herein address the performance in higher-order MIMO systems with reduced and fixed complexity using a channel ordering rule and a general two-dimensional set-partitioning. Referring now to the drawings, and more particularly to FIGS. 1 through 6, where similar reference characters denote corresponding features consistently throughout the figures, there are shown embodiments.

Embodiments herein consider a V-BLAST (Vertical-Bell Laboratories Layered Space-Time) transmission scheme in a Rayleigh fading environment using a Multiple-Input Multiple-Output (MIMO) system with n transmit and m≥n receive antennas is considered. The data is de-multiplexed into n sub-streams, mapped onto a constellation with a signal set of size $M=2^q$, where q is the number of bits per symbol and transmitted over n antennas simultaneously and representing the m×1 received signal vector y in complex baseband form as $$y = Hx + w \qquad (1)$$

where $x=[x_1, \ldots, x_n]^T$ is the n×1 transmitted data vector, w is n×1 noise vector with independent and identically distributed (i.i.d) circularly-symmetric complex Gaussian elements $w_i \sim CN(0, \sigma^2)$ and H is the m×n channel matrix with i.i.d elements $h_{ij} \sim CN(0, 1)$.

Here, transpose of a vector or a matrix is denoted by $(\cdot)^T$, while $(\cdot)^H$ indicates conjugate-transpose. The average power radiated from each antenna at the transmitter is normalized to 1/n, hence the total average power radiated is unity. It is assumed that H is known perfectly at the receiver. Embodiments herein define the signal-to-noise ratio as $SNR=1/\sigma^2$.

Using a general two-dimensional set-partitioning and an upper bound for probability of symbol error, embodiments herein shows that the Uniform Set Partitioning limits the performance of V-BLAST-CD to the diversity order of the first symbol for which intermediate decisions are arrived at during the detection process. The V-BLAST-CD along with configurable set-partition parameters is hereinafter referred to as "Reduced Set Successive Detector" (RSSD).

Embodiments herein demonstrate that application of pre-processing algorithm of the FSD to suit RSSD (hereinafter referred to as Ordered RSSD (ORSSD)) can be used to reduce the complexity of FSD for higher order MIMO systems with a small tradeoff.

FIG. 1 depicts a receiver system in a communication network, according to embodiments as disclosed herein. The receiver system comprises of a receiver 102 and a detector 101. The detector 101 may be present within the receiver 102. The detector 101 may also be present external to the receiver 102.

On the detector 101 receiving the signal from the receiver 102, the detector 101 performs the following steps in every stage for i=n, . . . , 1:

Step 1: The detector 101 calculates the matrix $Q_{n-i}=H^H_{n-i}H_{n-i}$, where $H_{n-i}$ denotes the matrix H with (n–i) columns corresponding to previous stages removed.

Step 2: The detector 101 selects the $k^{th}$ column from the matrix $Q_{n-i}$ according to the rule:

$$k = \text{argmax}_j [Q_{n-i}^{-1}]_{jj}, \text{ if } J_i \geq M/2 \text{ OR}$$

$$k = \text{argmin}_j [Q_{n-i}^{-1}]_{jj}, \text{ if } J_i < M/2.$$

where correct mapping assumption from k to the corresponding received symbol is made, which is used for detection in the $i^{th}$ stage.

The detector 101 performs the pre-processing according to chosen set partitions. The detector 101 has $J_n=M$ for improved performance, while the detector 101 selects set-partition parameters for the later stages to be small. If the number of set-partitions performed at a particular stage is M/2 or M, then the detector 101 detects the symbol with the largest post-processing noise amplification. Choosing the symbol with largest post-processing noise allows for a further reduction by the detector 101 in set partitions for the later stages.

The above steps performed by the detector 101 generalize the FSD pre-processing rule, while providing additional degrees of freedom to choose the operating parameters in successive detections.

For a given MIMO configuration and modulation scheme, the detector 101 chooses the ordering rule for ORSSD based on the trade-off between the required performance and complexity. For example, in an 8×8 system, instead of choosing $\Omega=\{M, M, 1, 1, 1, 1, 1, 1\}$ as in FSD, choosing $\Omega=\{M, M/2, 1, 1, 1, 1, 1, 1\}$ can reduce the complexity by nearly 50%.

Figure 2:
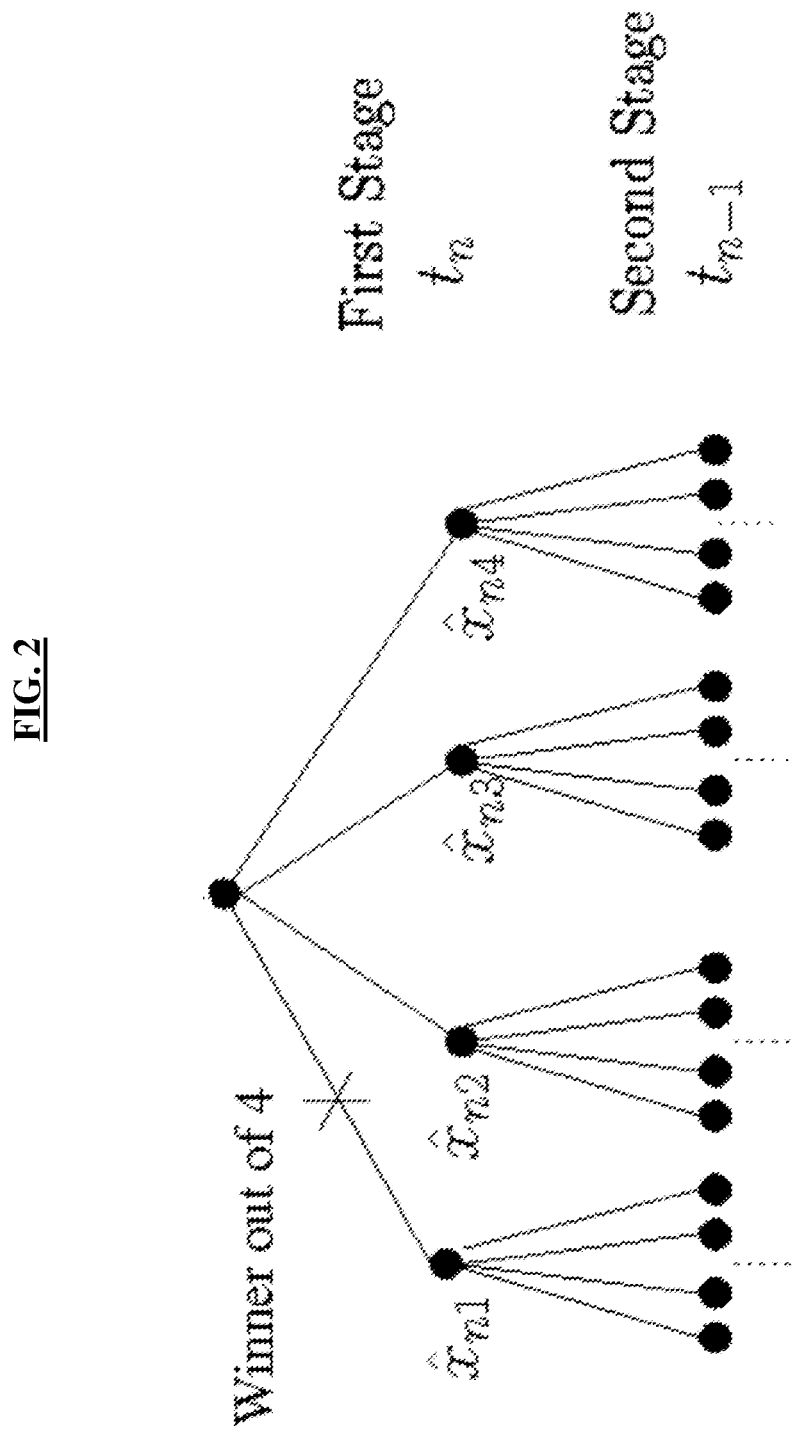
FIG. 2 illustrates an example of 16-QAM with 4-way set partitioning ($J_i=4$) for all stages, according to embodiments as disclosed herein.

Once the ordering rule has been selected, the detector 101 applies RSDD. The detector 101 subjects channel matrix H to QR decomposition H=QR, where Q is a complex-valued m×n matrix such that $QQ^H=I$, while R is an n×n upper-triangular matrix with real values along its diagonal. Here, I denotes an identity matrix. A n×1 vector $z=[z_1, \ldots, z_n]^T$ is defined as, $$z \triangleq Q^H y = Rx + \tilde{w} \qquad (2)$$

where $Q^H w = \tilde{w}$ is a n×1 noise vector distributed identically as w. And $r_j$ is defined as $r_j \triangleq [r_{ii}, r_{ii+1}, \ldots, r_{in}]^T$ from the $i^{th}$ row of R, containing only the elements from $r_{ii}$ to $r_{in}$, with $1 \leq i \leq n$. Using the Reduced Set Sequence Estimation and set-partitioning principles for performing successive detection, a two-dimensional set-partitioning $\Omega$ is defined as, $$\Omega \triangleq \{J_n, J_{n-1}, \ldots, J_1\} \qquad (3)$$

where the integer $J_i$ corresponds to the number of partitions of the signal set for symbol $x_i$. $J_i$ is constrained as non-increasing powers of 2, such that, $M \geq J_n \geq J_{n-1} \geq \ldots \geq J_1 \geq 1$ as shown in FIG. 2. The detector 101 starts the detection procedure from $z_n$, which does not experience any sub-stream interference. The detector 101 undertakes a slicing operation to make a hard decision on the winner from each of the $J_n$ subsets. Associated with stage $t_n$, a "survivor path vector", $p_k(t_n) \triangleq [\hat{x}_{nk}]$ is defined, where $1 \leq k \leq J_n$ and $\hat{x}_{nk}$ denotes the winner for symbol $x_n$ in the $k^{th}$ path of the tree. A Branch Metric (BM) is calculated for each of the $J_n$ winners as:

$$d(\hat{x}_{nk})=|z_n - \langle r_n p_k(t_n) \rangle|^2 \qquad (4)$$

where, $\langle a,b \rangle$ denotes the inner product between any two vectors a and b. The detector 101 then feeds back each $\hat{x}_{nk}$ to pick winners for the second sub-stream symbol $x_{n-1}$. After interference nulling, the detector 101 performs slicing operations to choose $J_n \times J_{n-1}$ winners. This procedure is continued until the detector 101 picks the winners for the sub-stream symbol $x_1$. The BMs for the tree branches at any $i^{th}$ stage of the symbol detection procedure are calculated as:

$$d(\hat{x}_{ik})=|z_i - \langle r_i p_k(t_i) \rangle|^2 \qquad (5)$$

where, $1 \leq k \leq \Pi^n_{l=i} J_l$ and $p_k(t_i)=[p_j(t_i+1), (\hat{x}_{iu})]$, with $1 \leq j \leq \Pi^n_{l=i+1} J_l$ and $1 \leq u \leq J_i$, for $1 \leq i \leq n-1$.

In the end, a set of tree paths S are left, such that, $|S|=\Pi^n_{i=1} J_i$, which, is hereinafter referred to as the "Subset Survivor Paths" (SSP). The detector 101 calculates a Path Metric for the $l^{th}$ SSP by summing up the corresponding BMs. Thus, $$D_l = \sum_{i=1}^{n} d(\hat{x}_{ik}), l \in |S|, \text{ and } k \in \left\{1 \ldots \prod_{j=1}^{n} J_j\right\} \text{ for each } i.$$

The solution $\hat{x}$ is given by, $$\hat{x} = \arg\min_{l \in |S|} D_l$$

Figure 3:
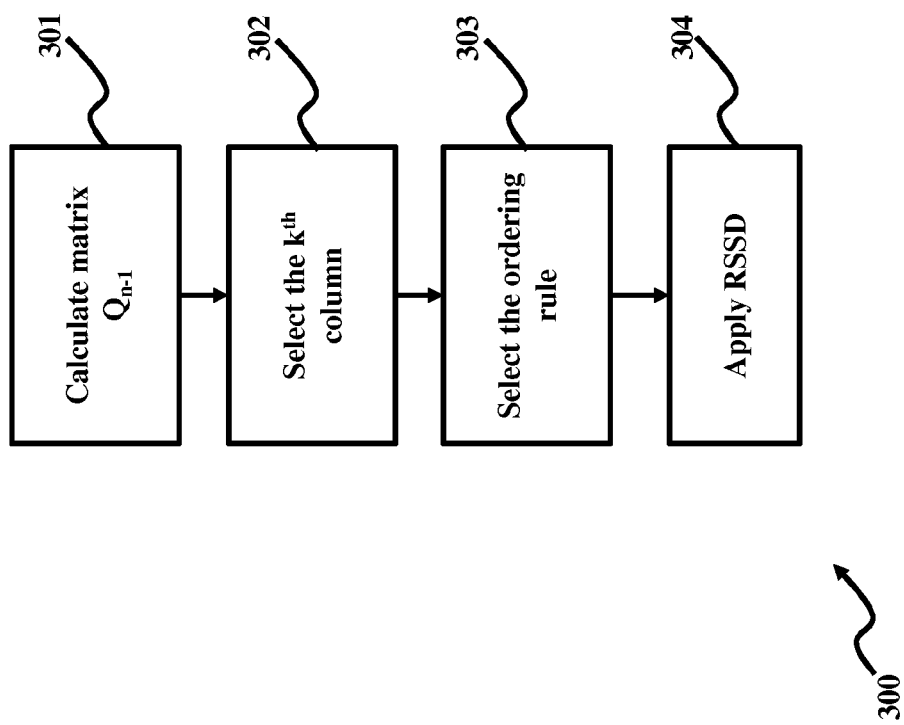
FIG. 3 is a flowchart illustrating the process of decoding, according to embodiments as disclosed herein.

FIG. 3 is a flowchart illustrating the process of decoding, according to embodiments as disclosed herein. On the detector 101 receiving the signal from the receiver 102, the detector 101 calculates (301) the matrix $Q_{n-i}=H^H_{n-i}H_{n-i}$, where $H_{n-i}$ denotes the matrix H with (n–i) columns corresponding to previous stages removed. The detector 101 then selects (302) the $k^{th}$ column according to the rule:

$$k = \text{argmax}_j [Q_{n-i}^{-1}]_{jj}, \text{ if } J_i \geq M/2; \text{ OR}$$

$$k = \text{argmin}_j [Q_{n-i}^{-1}]_{jj}, \text{ if } J_i < M/2.$$

where correct mapping assumption from k to the corresponding received symbol is made, which is used for detection in the $i^{th}$ stage. For a given MIMO configuration and modulation scheme, the detector 101 chooses (303) the ordering rule for ORSSD based on the trade-off between the required performance and complexity. For example, in an 8×8 system, instead of choosing $\Omega=\{M, M, 1, 1, 1, 1, 1, 1\}$ as in FSD, choosing $\Omega=\{M, M/2, 1, 1, 1, 1, 1, 1\}$ can reduce the complexity by nearly 50%. Once the ordering rule has been selected, the detector 101 applies (304) RSDD. The various actions in method 300 may be performed in the order presented, in a different order or simultaneously. Further, in some embodiments, some actions listed in FIG. 3 may be omitted.

In an example, consider an 8×8 and 6×6 MIMO SM systems which comprises of eight and six SM streams respectively and 16-QAM. The performance of ORSSD with different set partition choices was determined.

Figure 4:
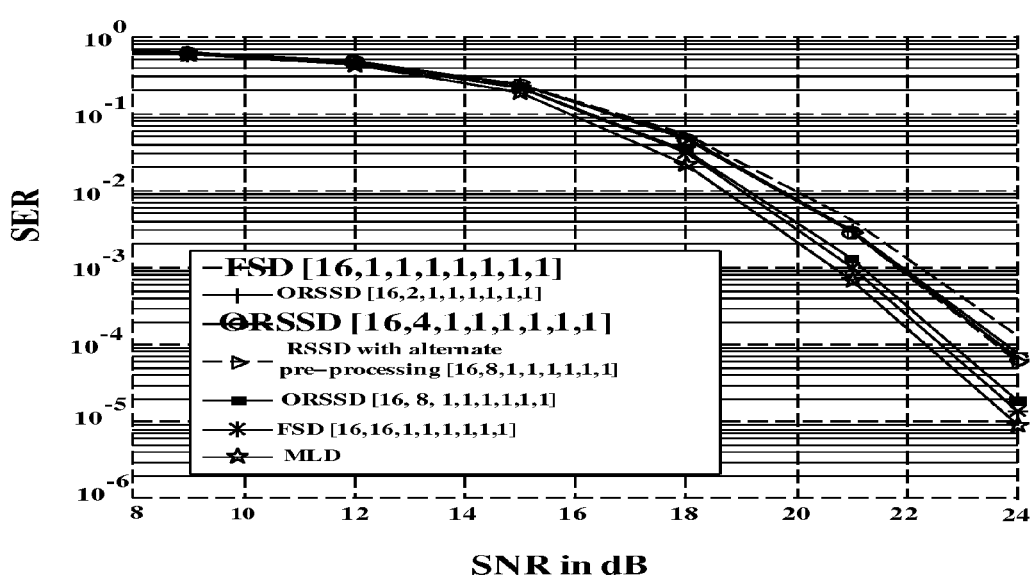
FIG. 4 illustrates the simulation results showing SER vs. SNR for 8×8 System with 8 SM streams and 16-QAM.

FIG. 4 shows the Symbol Error Rate (SER) performance of 8×8 MIMO system with different set partition choices of ORSSD, along with FSD and MLD. It shows that the RSSD configuration with $\Omega=\{16, 8, 1, 1, 1, 1, 1, 1\}$ and an alternate pre-processing rule where the symbol with smallest post-processing noise is chosen in stage two gives a poorer performance compared to ORSSD with same $\Omega$. This verifies the efficacy of the proposed pre-processing rule. Further, ORSSD configuration with $\Omega=\{16, 8, 1, 1, 1, 1, 1, 1\}$ has a performance comparable to that with $\Omega=\{16, 16, 1, 1, 1, 1, 1, 1\}$ (which is FSD), with a performance loss of about 0.2 dB when SNR=24 dB. This is so when the number of stages for which FE is to be performed in the FSD ($\sqrt{n}-1$) is a real number with the fractional part greater than 0.5. The performance loss is smaller for a system such as 6×6, since $(\sqrt{6}-1)\approx 1.45$ is nearer to 1 than 2.

Figure 5:
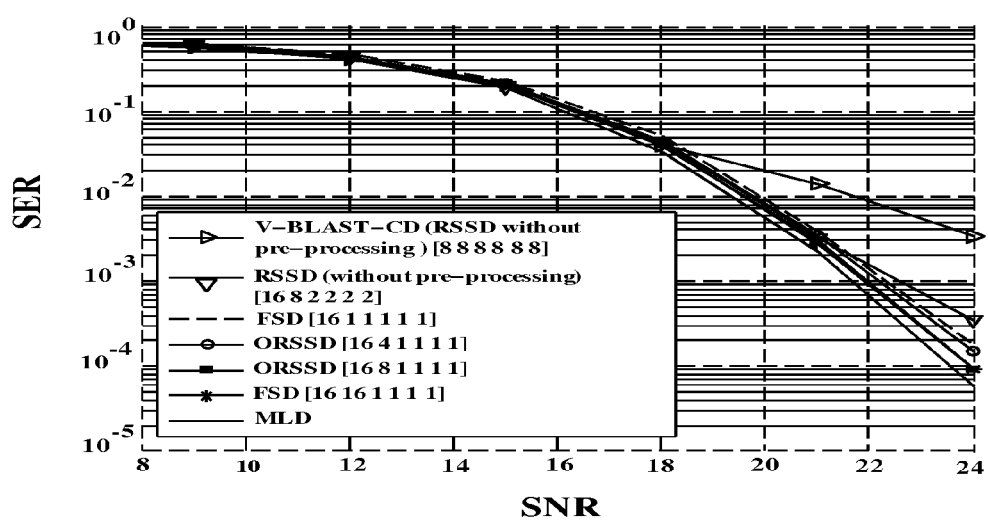
FIG. 5 illustrates the simulation results showing the SER vs. SNR for 6×6 System with 6 SM streams and 16-QAM

The above may be verified from FIG. 5, where it shows that the FSD configuration of $\Omega=\{16, 16, 1, 1, 1, 1\}$ and ORSSD configuration of $\Omega=\{16, 8, 1, 1, 1, 1\}$ give nearly identical performance in a 6×6 system and are virtually indistinguishable from each other.

FIG. 5 illustrates that RSSD configuration of $\Omega=\{16, 8, 2, 2, 2, 2\}$ without any pre-processing gives a sub-optimal performance, even though it is a significant improvement over V-BLAST-CD.

FIG. 6 illustrates a table enumerating reducing the set partition to M/2 reduces the complexity by about 50%, but with a small degradation in performance. However, any further reduction in the set partition gives a performance comparable to having a "Single Expansion" for that particular stage, although it reduces the complexity further.

Embodiments herein discloses a performance and complexity of low-complexity RSSD with configurable set partition parameters, which in conjunction with a pre-processing technique can be used obtain a quasi-ML performance in MIMO spatial multiplexing systems. The detector 101 generalizes the FSD and may be used to reduce the complexity of the FSD by nearly 50% for MIMO systems larger than 4×4, with a small trade-off in performance.

Embodiments above disclose the use of the detector only in the context of MIMO spatial multiplexing systems; however it may be obvious to a person of ordinary skill in the art to implement the embodiments as disclosed herein in interference-limited systems, where MLD is employed after suitable processing. Embodiments disclosed herein may also be applied to coded systems.

Embodiments herein illustrate that with a proper choice of set-partition parameters, RSSD not only increases the diversity order of symbols at a fixed, lower complexity than V-BLAST-CD, but also provides additional SNR gains for any number of SM streams.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments herein addresses the performance in higher-order MIMO system with reduced and fixed complexity using a channel ordering rule and a general two-dimensional set-partitioning. Therefore, it is understood that the scope of the protection is extended to such a program and in addition to a computer-readable means having a message therein; such computer-readable storage means contain program-code means for implementation of one or more steps of the method, when the program runs on a server or mobile device or any suitable programmable device. The method is implemented in a preferred embodiment through or together with a software program written in e.g., Very high-speed integrated circuit Hardware Description Language (VHDL), another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for performing decoding in a communication system, the method comprising of:
    calculating a matrix $Q_{n-i}=H^H_{n-i}H_{n-i}$ by a detector, where $H_{n-i}$ denotes a matrix H with (n−i) columns corresponding to previous stages removed;
    selecting the $k^{th}$ column from the matrix by the decoder according to a rule:
        k=arg $\max_j[Q^{-1}_{n-i}]_{jj}$, if $J_i \geq M/2$, OR
        k=arg $\min_j[Q^{-1}_{n-i}]_{jj}$, if $J_i < M/2$; where M is size of a received signal set and $J_i$ corresponds to number of partitions of the received signal set;
    choosing an ordering rule by the detector, based on the selected $k^{th}$ column; and
    performing Reduced Set Successive Detector (RSSD) by the detector based on the ordering rule.

2. The method, as claimed in claim 1, wherein the communication system is Multiple Input Multiple Output (MIMO) spatial multiplexing based communication system.

3. The method, as claimed in claim 1, wherein the detector selects the $k^{th}$ column from the matrix $Q_{n-i}$ by performing a correct mapping assumption from k to corresponding received symbol is made.

4. The method, as claimed in claim 1, wherein the detector performs operations based on chosen set partitions.

5. A detector configured for performing decoding in a communication system, the detector further configured for:
   calculating a matrix $Q_{n-i} = H^H_{n-i} H_{n-i}$, where $H_{n-i}$ denotes a matrix H with (n−i) columns corresponding to previous stages removed;
   selecting the $k^{th}$ column from the matrix according to a rule:
   $k = \arg\max_j [Q^{-1}_{n-i}]_{jj}$, if $J_i \geq M/2$, OR
   $k = \arg\min_j [Q^{-1}_{n-i}]_{jj}$, if $J_i < M/2$; where M is size of a received signal set and $J_i$ corresponds to number of partitions of the received signal set;
   choosing an ordering rule, based on the selected $k^{th}$ column; and
   performing Reduced Set Successive Detector (RSSD) based on the ordering rule.

6. The detector, as claimed in claim 5, wherein the communication system is a Multiple Input Multiple Output (MIMO) spatial multiplexing based communication system.

7. The detector, as claimed in claim 5, wherein the detector is configured for selecting the $k^{th}$ column from the matrix $Q_{n-i}$ by performing a correct mapping assumption from k to corresponding received symbol is made.

8. The detector, as claimed in claim 5, wherein the detector is configured for performing operations based on chosen set partitions.

\* \* \* \* \*